United States Patent [19]
Ohmori et al.

[11] Patent Number: 5,850,384
[45] Date of Patent: Dec. 15, 1998

[54] DISK CARTRIDGE

[75] Inventors: Kiyoshi Ohmori, Kanagawa; Takatsugu Funawatari, Miyagi, both of Japan

[73] Assignee: Sony Corporation, Toyko, Japan

[21] Appl. No.: 527,042

[22] Filed: Sep. 12, 1995

[30] Foreign Application Priority Data

Sep. 16, 1994 [JP] Japan .................................... 6-221576

[51] Int. Cl.$^6$ .............................. G11B 3/70; G11B 23/03
[52] U.S. Cl. ........................................... 369/291; 360/133
[58] Field of Search ............................. 360/133; 369/291

[56] References Cited

U.S. PATENT DOCUMENTS

| | | | |
|---|---|---|---|
| 5,040,167 | 8/1991 | Tanaka et al. | 369/291 |
| 5,043,974 | 8/1991 | Nakagawa | 369/291 |
| 5,045,959 | 9/1991 | Ishimatsu | 360/133 |
| 5,051,857 | 9/1991 | Akiyama | 360/133 |
| 5,077,625 | 12/1991 | Shiba et al. | 360/133 |
| 5,084,861 | 1/1992 | Takahashi | 369/291 |
| 5,237,560 | 8/1993 | Tani et al. | 360/133 |
| 5,381,293 | 1/1995 | Akiyama et al. | 360/133 |

FOREIGN PATENT DOCUMENTS

| | | |
|---|---|---|
| 336 637 A | 10/1989 | European Pat. Off. . |
| 358 269 A | 3/1990 | European Pat. Off. . |
| 421 775 A | 4/1991 | European Pat. Off. . |
| 442 502 A | 8/1991 | European Pat. Off. . |
| 494 794 A | 7/1992 | European Pat. Off. . |

*Primary Examiner*—Allen T. Cao
*Attorney, Agent, or Firm*—Frommer Lawrence & Haug, LLP; William S. Erommer

[57] ABSTRACT

A disk cartridge including a housing which rotatably accommodates therein a disk, such as a magneto-optic disk, which has a main recording surface and a protective surface. The housing is formed of upper and lower halves with the upper half having a first opening capable of exposing the protective layer to a magnetic-field application head of the disk unit and the lower half having a second opening capable of exposing the main recording surface to an objective lens assembly of the disk unit when the disk cartridge is inserted into the disk unit. The first and second openings are provided at a cartridge insertion end of the cartridge and are each of a defined width measured in the lateral direction of the cartridge and are designed such that the defined width of one of the first and second openings is smaller than the defined width of the other of the first and second openings. In this disk cartridge, the upper and lower halves respectively include first and second bridge portions provided at the cartridge insertion end with the first and second bridge portions interconnecting respectively first and second pairs of opposed side edges of the first and second openings. In order to enhance the rigidity of both of the bridge portions, the thickness of one of the first and second bridge portions is greater than the thickness of the other of the first and second bridge portions.

27 Claims, 9 Drawing Sheets

DISK CARTRIDGE

FIELD OF THE INVENTION

The present invention relates to a disk cartridge equipped with a housing which rotatably accommodates therein a disk such as a magneto-optic disk.

BACKGROUND OF THE INVENTION

Conventionally, a magneto-optic disk unit is well known as a disk unit which operates to write information signals to and/or read information signals from a magneto-optic disk which is rotatably accommodated in a housing of a disk cartridge.

Traditionally, the above-noted disk unit comprises a cartridge loading mechanism with a cartridge holder through which a disk cartridge is supported, a rotating mechanism which includes a disk table provided below the cartridge loading mechanism for holding the magneto-optic disk and a spindle motor rotatively driving the disk table, an optical pick-up device provided rearward of the rotating mechanism and having an objective lens, an external magnetic-field generator provided above the optical pick-up device and having a magnetic-field application head, and a lifting mechanism provided forward of both the external magnetic-field generator and the optical pickup device for traversing upwardly and downwardly the rotating mechanism.

In the conventional magneto-optic disk unit as set out above, after the disk cartridge is carried at a predetermined cartridge loading position, writing and reading of information signals to and from the magneto-optic disk are achieved by rotating the magneto-optic disk at the cartridge loading position.

The disk cartridge to be loaded in this type of magneto-optic disk units are generally constructed as shown in FIGS. 1 and 2 wherein a disk cartridge 201 comprises a disk-like magneto-optic disk 202 and a housing 203 rotatably accommodating therein the magneto-optic disk 202.

Of these, the magneto-optic disk 202 is formed with a magnetic recording layer in a recording region. A magneto-optic disk means (hereinafter "disk unit") writes information signals to and/or reads information signals from the magnetic recording layer.

The magneto-optic disk 202 has a main recording surface serving as a signal recording surface at one side thereof which is formed with a disk-like metallic chucking hub 202a in the center portion of the disk. The housing 203 is also comprised of an opposing pair of substantially box-like halves, namely an upper half 204 and a lower half 205, which halves define therein an internal space sized to accommodate the magneto-optic disk 202. The housing 203 is constructed such that these halves 204 and 205 abut each other.

The housing 203 is formed at its front portion 209 with a shutter opening member engaging portion 224 which engages a shutter opening pin (set out below) of a cartridge holder to shift an opening of the housing holder to shift an opening of the housing into its open state. A cartridge insert pin hole 228 is provided in the vicinity of the front section of one side wall portion 207 of the housing into which a cartridge hold pin (set out below) is inserted.

The upper half 205 of the housing 203 is formed with cartridge positioning-pin engagement holes 225 and 226 which engage cartridge positioning-pins (set out below) to position the disk cartridge 201 in the magneto-optic disk unit in its proper horizontal orientation. An erroneous erase protect member 227 is provided in the vicinity of the cartridge positioning-pin engagement hole 226 so as to select whether writing of an information signal on the magneto-optic disk 202 is enabled or disabled.

As is shown in FIG. 2, the lower half 205 is formed with a first opening 206 which is provided for exposing a portion of a main recording surface of the magnetic-optic disk 202 and the chucking hub 202a to the outside of the cartridge. The first opening 206 is provided substantially midway between both side walls 207 and 208 of the housing 203 in the lateral direction thereof, and comprises an elongated hole extending from the front portion 209 of the housing 203 to substantially the center portion in the longitudinal direction of the housing. The first opening is designed so that the chucking hub 202a faces a disk table of a disk rotary drive mechanism (described later), and so that the main recording surface of the magneto-optic disk 202 is exposed to the objective lens of the optical pick-up device (described later), when the disk cartridge 201 is loaded into the magneto-optic disk unit.

As is shown in FIG. 1, the upper half 204 is formed with a second opening 216 which is located in the vicinity of the front portion 209 of the housing 203 and configured to face the first opening 206. The second opening 216 is formed as a substantially rectangular opening sized to expose a portion of the protective surface formed on the other side of the magneto-optic disk 202 to the outside of the cartridge. The second opening is designed so that the protective layer defined at the other side of the magneto-optic disk 202 is exposed to the magnetic-field application head (described later), when the disk cartridge 201 is loaded into the magneto-optic disk unit.

Bridge portions 206a and 216a are provided at locations respectively corresponding to the openings 206 and 216 of the front portion 209 of the housing 203. These bridge portions are formed of cut-out concavities which ensure easy approach of the optical pick-up device and the magnetic-field application head to the respective main recording surface of the magneto-optic disk 202.

That is, the thickness of the central portion (thicknesses of the bridge portions 206a and 216a) of the housing 203, adjacent to the front portion 209, is designed to be thin-walled at the locations corresponding to the first opening 206 and the second opening 216.

Also, attached to the housing 203 is a shutter member 211 which is slidable in order to open and close both openings 206 and 216. The shutter member 211 comprises a first shutter plate 212 capable of shutting the first opening 206 of the lower half 205, a second shutter plate 213 which is arranged in parallel with the first shutter plate 212 to shut the second opening 216 of the upper half 204, and a connection portion 214 interconnecting bases of the second shutter plate 213 and the first shutter plate 212.

The first shutter plate 212 has the form of a rectangle having a comparatively narrow width sized to cover the first opening 206. The top end of the first shutter plate 212 is pressurized and supported by means of a shutter pressure plate 215, thereby preventing the first shutter plate from being removed from the surface of the housing 203. On the other hand, the second shutter plate 213 has the form of a rectangle having a width sized to cover at least the second opening 216.

The height of the connection portion 214 is set at a size substantially equal to the thickness of the thin-walled central portion of the housing 203. Spring hooks of a coiled torsion spring (not shown) are mounted between the connection portion 214 and the housing 203, for constantly biasing the shutter member 211 in a direction wherein the first opening 206 and the second opening 216 are shut.

In FIG. 1, the two shutter traveling directions are designated by the opposing arrows x, namely a close direction wherein the openings 206 and 216 are both closed and an open direction wherein the openings are both opened.

In recent years, utilizing this type of disk cartridge has required that the disk unit into which it is inserted be thin-walled. Thus, the thickness. of the bridge portions 206*a* and 216*a* which interconnect at the cartridge insertion end of the housing both side edges of the respective first and second openings 206 and 216 is smaller than that of each of the halves 204 and 205. For the reasons set out above, the rigidity of the housing 203 tends to be lower at the bridge portions 206*a* and 216*a*. Thus, if the cartridge is dropped, the base portion of the bridge portion 206*a* of the upper half 204 and the base portion of the bridge portion 216*a* of the lower half 205 can be broken due to shock forces generated thereby.

OBJECTS OF THE INVENTION

Therefore, it is an object of the present invention to provide a disk cartridge insertable into a magneto-optic disk unit which avoids the aforementioned deficiencies of the prior art.

It is therefore an object of the present invention to provide a disk cartridge insertable into a magneto-optic disk unit which is capable of enhancing the rigidity of the bridge portions of the cartridge and thus prevent occurrence of damage to the bridge portions owing to shock forces created when the cartridge is dropped.

Various other objects, advantages and features of the present invention will become readily apparent from the ensuing detailed description and the novel features will be particularly pointed out in the appended claims.

SUMMARY OF THE INVENTION

In order to accomplish the aforementioned objects, a disk cartridge according to the present invention is provided which accommodates a disk having a main recording surface on one side thereof and a protective surface on an opposite side thereof. This disk cartridge is insertable at a cartridge insertion end thereof into a disk unit which writes information signals to and/or reads information signals from the main recording surface of the disk and includes an objective lens assembly for converging a laser beam on the main recording surface of the disk and a magnetic field application head for applying an external magnetic-field to the disk.

The disk cartridge further includes an upper half and a lower half in opposed relation with the disk being rotatably accommodated between the upper and lower halves. The upper half has a first opening capable of exposing the protective layer to the magnetic field application head and the lower half has a second opening capable of exposing the main recording surface to the objective lens assembly when the disk cartridge is inserted into the disk unit.

Each of the first and second openings is of a defined width measured in the lateral direction of the disk cartridge. In applicants' invention, the defined width of one of the first and second openings is smaller than the defined width of the other of the first and second openings.

Moreover, in the disk cartridge made in accordance with the teachings of the present invention, the upper and lower halves respectively include first and second bridge portions provided at the cartridge insertion end. Each of these bridge portions interconnects both side edges of the corresponding first and second openings of each half of the cartridge. In applicants' invention, the thickness of one of the first and second bridge portions is greater than the thickness of the other of the first and second bridge portions.

Therefore, when the respective halves are assembled to each other, the rigidity of the bridge portion having the smaller half thickness is dependent on the rigidity of the bridge portion having the greater half thickness, and consequently, the total rigidity of the cartridge with respect to both bridge portions is enhanced. This reduces the chances of damage to the bridge portion as a result of shock forces generated by dropping of the cartridge on a hard surface.

BRIEF DESCRIPTION OF THE DRAWINGS

The following detailed description, given by way of example, but not intended to limit the invention solely to the specific embodiments described may best be understood in conjunction with the accompanying drawings in which.

DETAILED DESCRIPTION OF THE PREFERRED EMBODIMENTS

Figure 1:
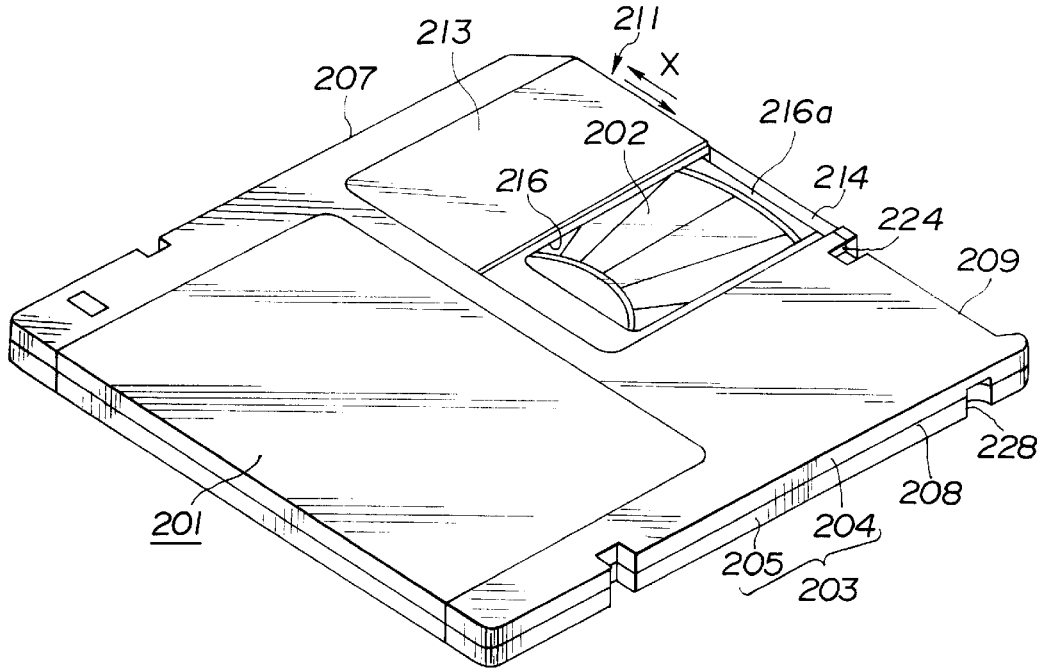
FIG. 1 is a perspective view specifically illustrating an upper side of a prior art disk cartridge in the shutter open state.
Figure 2:
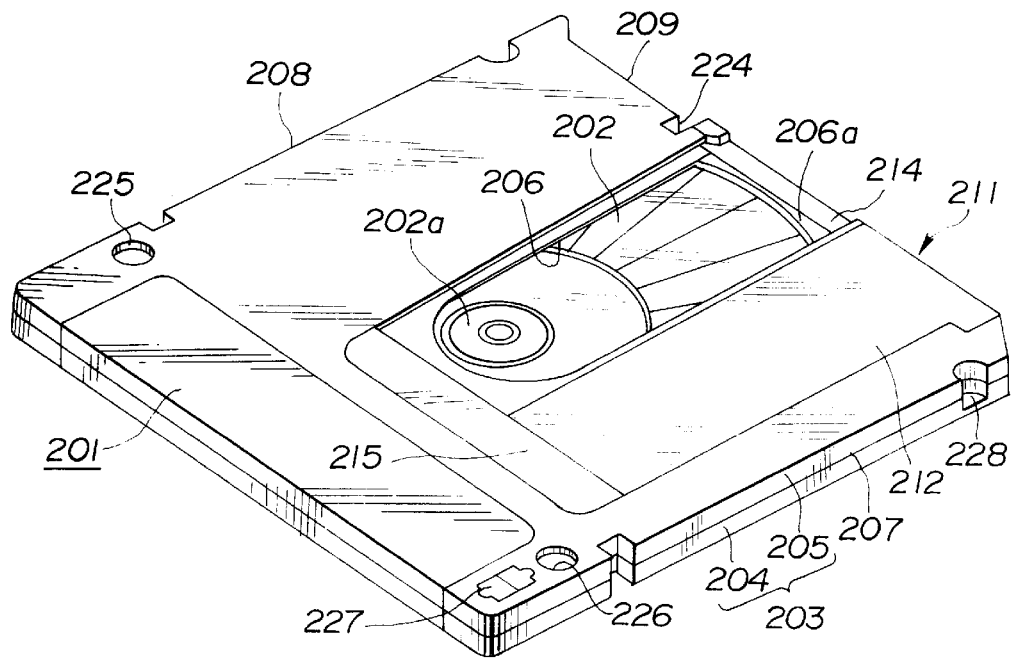
FIG. 2 is a perspective view specifically illustrating a lower side of the prior art disk cartridge of FIG. 1 in the shutter open state.

Referring now to FIGS. 3(A) and 3(B) to 7, a preferred embodiment of the cartridge disk 301 in accordance with the teachings of the present invention is illustrated. This disk cartridge 301 includes a magneto-optic disk 302 and a housing 303 rotatably accommodating therein the magneto-optic disk 302. The magneto-optic disk 302 is formed with a main magnetic recording surface in its data recording region on one side thereof. A magneto-optic means ("disk unit") writes information signals to and/or reads information signals from the main magnetic recording layer. The magneto-optic disk 302 has a disk-like metallic chucking hub 302a formed in the center portion of the disk.

As is shown in FIGS. 3(A), 3(B), 4 and 5, the housing 303 is comprised of one opposing pair of substantially box-like halves, namely an upper half 304 and a lower half 305, which halves respectively define therein enclosures 304a and 305a sized to accommodate the magneto-optic disk 302 through openings provided at the front portions thereof. The cartridge is constructed such that these halves 304 and 305 are assembled to each other by ultrasonic welding.

Figure 4:
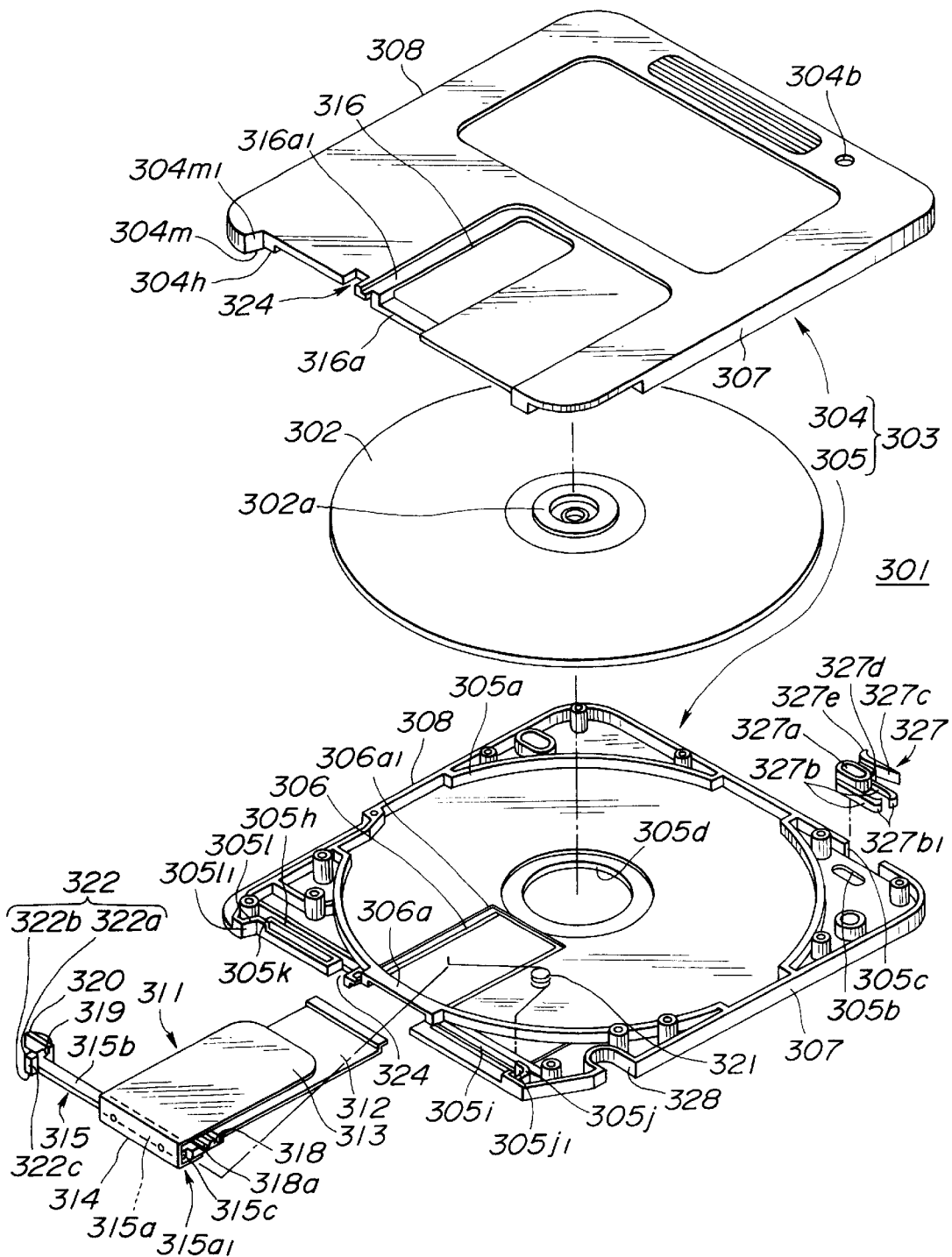
FIG. 4 is a top exploded perspective view illustrating the disk cartridge of the present invention.
Figure 5:
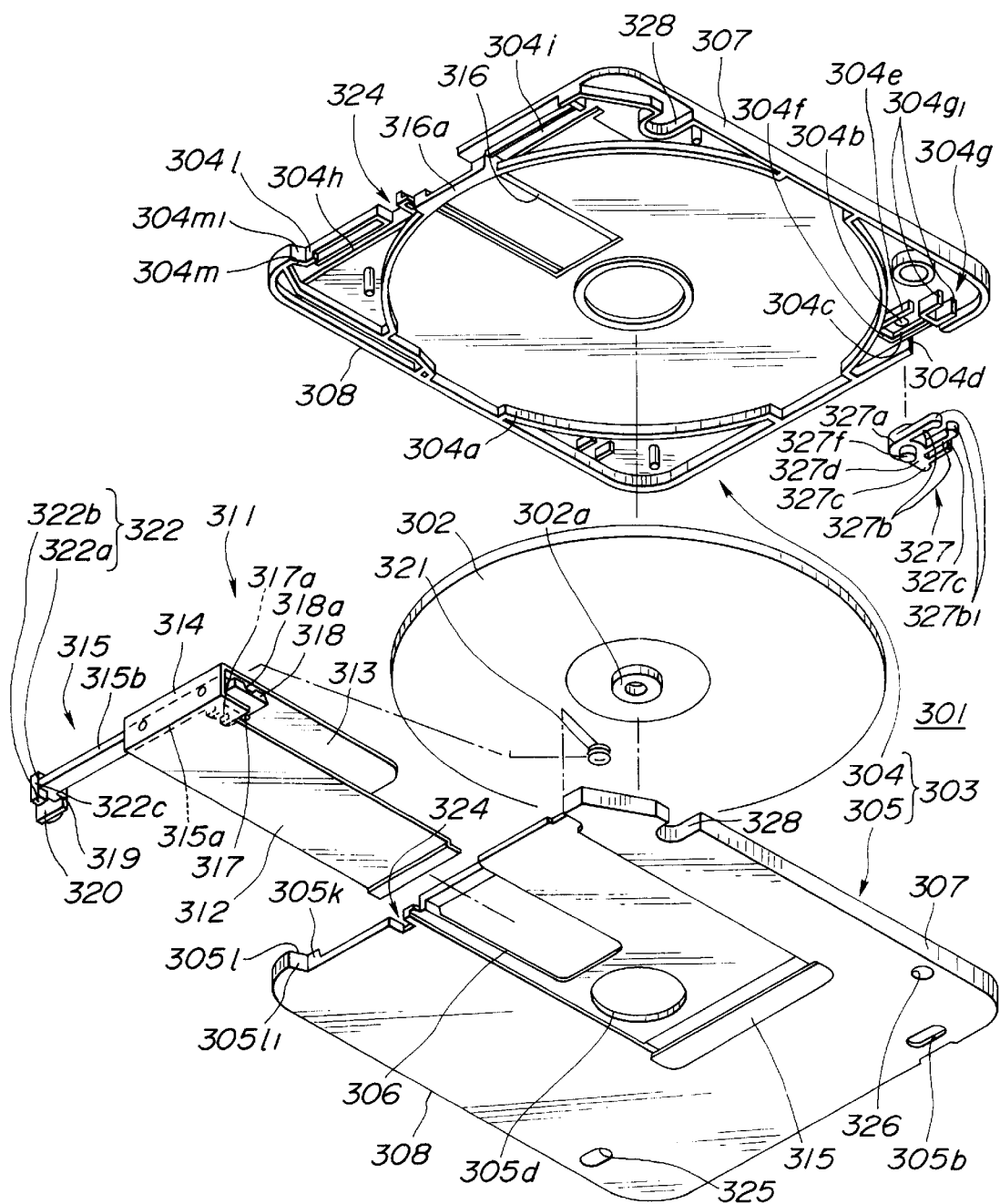
FIG. 5 is a bottom exploded perspective view illustrating the disk cartridge of the present invention.
Figure 6:
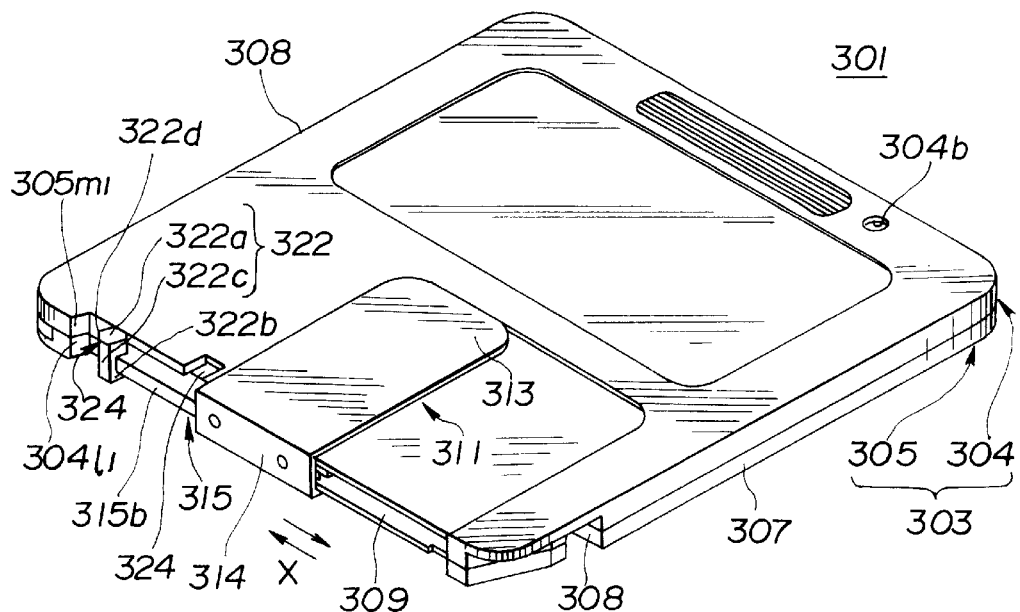
FIG. 6 is a top perspective view illustrating the disk cartridge of the present invention in its shutter closed state.

As is best shown in FIGS. 4 and 5, the housing 303 includes at its front portion 309 a shutter opening member engaging portion 324 formed which engages a shutter opening pin of a cartridge holder to slide the shutter member 311 such that openings provided in the housing are exposed as will be discussed in more detail below. A pin insertion hole 328 is provided in the vicinity of the front section of one side wall 307 of the cartridge into which a cartridge hold pin is inserted.

The lower half 305 of the housing 303 is formed with cartridge positioning-pin engagement holes 325 and 326 (see FIG. 5) which engage cartridge positioning-pins to position the disk cartridge 301 in the magneto-optic disk unit in its proper horizontal orientation. A guide hole 305b is provided in the vicinity of the cartridge positioning-pin engagement hole 326 which penetrates the inside and outside surfaces of the cartridge and extends in the lateral direction of the cartridge. A cut-out groove 305c is also provided adjacent to the cartridge positioning pin engagement hole 326 which extends in the same direction as the guide hole 305b and opens in the longitudinal direction of the cartridge.

Additionally, the lower half 305 is formed with a central opening 305d through which the chucking hub 302a is exposed to the outside of the cartridge and a second opening 306 through which a portion of the signal recording surface of the magneto-optic disk 302 is exposed to the outside of the cartridge.

The central opening 305d is formed of a circular hole which penetrates the inside and outside of the cartridge in the center portion of the lower half 305 of the cartridge 301. The central opening is designed so that the chucking hub 302a faces a disk table of a disk rotary drive mechanism, when the disk cartridge 301 is loaded into the magneto-optic disk unit.

The second opening 306 is formed of an elongated hole longitudinally extending from the front portion 309 of the housing 303 substantially to the central portion of the cartridge and substantially midway between both side walls 307 and 308 of the housing 303. The second opening is designed so that the signal recording surface of the magneto-optic disk 302 is exposed to the optical pick-up device when the disk cartridge 301 is loaded into the magneto-optic disk unit.

The upper half 304 is formed with a through opening 304b which extends through the cartridge and a cut-out groove 304c which opens in the longitudinal direction of the cartridge and extends in the lateral direction of the cartridge. The former is located at a position of the upper half corresponding to the inside end of the above-noted guide hole 305b, the inside end facing the central portion of the cartridge with regard to the lateral direction of the cartridge. The latter is located at a position of the upper half corresponding to the cut-out groove 305c.

The inside wall surface of upper half 304 is formed integrally with a first guide 304d opposing the cut-out opening surface of the above-noted cut-out groove 304c which is designed to guide a protect slider. The inside wall surface of the upper half 304 is also provided with a second guide 304e opposing the first guide 304d through a space greater than the inside diameter of the through opening 304b which is also designed to guide the protect slider.

In addition, the inside wall surface of the upper half 304 is formed integrally with stoppers 304f and 304g opposed to each other (see FIG. 5) for restricting the movement of the protect slider, at both sides (in the transverse direction of the cartridge) of the guides 304d and 304e. The stopper 304g which is close to one side wall 307 of the housing 303, is preferably a substantially rectangular stopper (in its plan view) having an engagement portion 304g1 so that the protect slider is urged in a direction of the opposing lateral directions of the cartridge and is brought into engagement with one side wall of the cartridge.

Figure 3A:
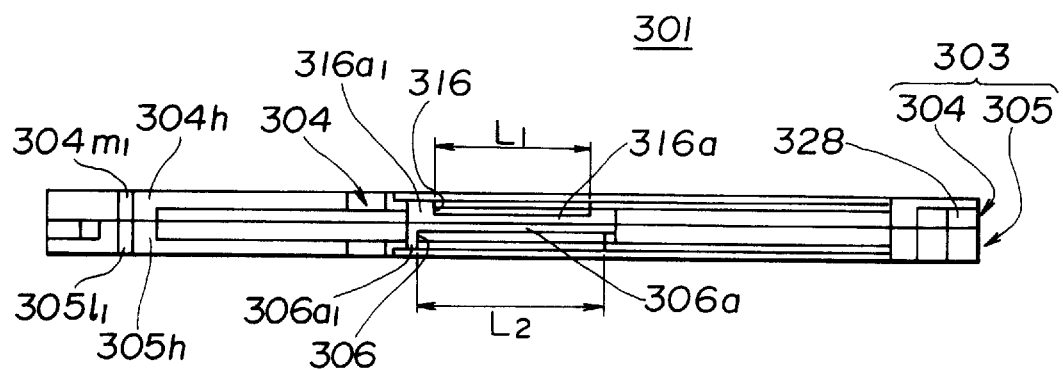
FIGS. 3(A) and 3(B) are front elevational views respectively illustrating an assembled condition and an exploded condition of a preferred embodiment of a disk cartridge in accordance with the teachings of the present invention.
Figure 3B:
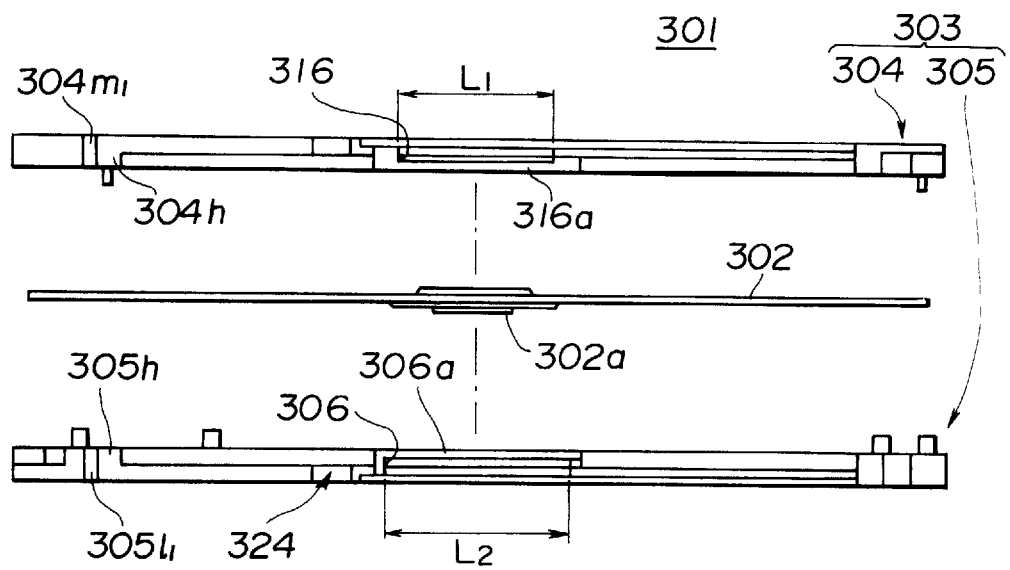

The upper half is also formed with a first opening 316 which is provided in the vicinity of the front portion 309 of the housing 303 and opposes the second opening 306 of the lower half 305. The first opening 316 of the upper half 304 is preferably a rectangular opening sized to expose a portion of the main recording surface provided on one side of the magneto-optic disk 302. Each of the openings 306 and 316 has a defined width measured in the lateral direction of the cartridge. As is shown in FIGS. 3(A) and 3(B), the first opening 316 has a defined width dimension $L_1$, which is smaller than the defined width dimension $L_2$ of the second opening 306, i.e., $L_1<L_2$ (see FIGS. 3A and 3B). The first opening 316 is designed so that the protective surface on one side of the magneto-optic disk 302 is exposed to the magnetic-field application head when the disk cartridge 301 is loaded into the magneto-optic disk unit.

As is best shown in FIGS. 3A, 3B, 4 and 5, bridge portions 306a and 316a are provided at locations corresponding to the respective openings 306 and 316 in the front portion 309 of the upper and lower halves 304 and 305 (the housing 303). Each of the bridge portions 306a and 316a interconnects, at the cartridge insertion end, both side edges of each of the openings 306 and 316. The bridge portions are preferably formed as cutout concavities which are designed to ensure easy approach of the magnetic-field application head and the optical pick-up device to the respective protective surface and main recording surface of the magneto-optic disk 302.

More specifically, the thickness of the central portion (thicknesses of the bridge portions 306a and 316a) of the housing 303, close to the front portion 309, is so designed to be thin-walled at the locations corresponding to the first opening 316 and the second opening 306. In addition, the thickness of the base $316a_1$ of the bridge portion 316a of the upper half is greater than the thickness of the base $306a_1$ of the bridge portion 306a of the lower half.

The lower half 305 of the housing 303 is formed integrally with a lower-first guide 305h and a lower-second guide 305i. These guides extend outwardly from both sides of the bridge portion 306a in the lateral direction of the cartridge and project from the inside wall of the lower half.

The lower half 305 includes a spring hanger 305j at the location adjacent to side wall 307 of the housing 303. The spring hanger has a concave groove 305j1 and projects from the inside wall of the lower half.

Additionally, the lower half 305 includes a stopper 305k for a shutter member at a location adjacent to the other side wall 308 of the cartridge, in such a manner so as to oppose the above-noted spring hanger 305j. The stopper 305k is formed integrally with an upright portion 305*l* at its one end facing the side wall 308 of the housing 303. The upright portion 305*l* which forms a part of the shutter opening member engaging portion 324 and has a pin guide surface 305$l_1$ enlarges the opening of the engaging portion.

The upper half 304 of the housing 303 includes an upper-first guide 304*h* and an upper-second guide 304*i* which both extend outwardly from both sides of the bridge portion 316*a* in the lateral direction of the cartridge and project from the inside wall of the upper half.

The upper half 304 also includes a stopper 304*l* associated with the above-noted stopper 305*k* at a location adjacent to the side wall 308 of the housing 303, for restricting the movement of the shutter member. The stopper 304*l* includes an upright portion 304*m* at its one end facing the side wall 308 of the housing 303. The upright portion 304*m* forms a portion of the shutter opening member engaging portion 324 and has a pin guide surface 304$m_1$ which enlarges the opening of the engaging portion.

As is shown in FIGS. 4 and 5, a write protect slider 327 is provided in the disk cartridge of the present invention which serves as an erroneous erase protect member to thereby select whether writing of an information signal on the magneto-optic disk 302 is enabled or disabled. The write protect slider 327 is associated with the guides 304*d* and 304*e* and includes a base 327*a* which is capable of opening and closing the through opening 304*b* of the upper half 304. The write protect slider 327 further includes an engaging portion 327*b* which is integrally formed with the base 327*a* and has a nail portion 327$b_1$ engageable with the stopper 304*g*. The write protect slider is arranged so that the slider is accommodated in the housing 303 to be slidable between the stoppers 304*f* and 304*g* in the lateral direction of the cartridge.

The base 327*a* of the write protect slider 327 is integrally formed with a cover portion 327*c* through a connection portion 327*d* such that the cut-out grooves 304*c* and 305*c* of the halves 304 and 305 can be covered. The cover portion 327*c* includes a slider operating portion 327*e* exposed to the respective cut-out grooves 304*c* and 305*c* at its inside end, facing the central portion of the cartridge with regard to the lateral direction of the cartridge.

Additionally, the base 327*a* of the write protect slider 327 is integrally formed with a projecting portion 327*f* facing into the guide hole 305*b* of the lower half 305.

In order to open and close both of the openings 306 and 316, a metallic shutter member 311 is slidably installed in the housing 303. The shutter member 311 includes a first shutter plate 312 shutting the second opening 306 of the lower half 305, a second shutter plate 313 arranged in parallel with the first shutter plate 312 for shutting the first opening 316 of the upper half 304, and a connection portion 314 interconnecting bases of the first shutter plate 312 and the second shutter plate 313. Preferably, the first shutter plate 312 is in generally the form of a rectangle having a comparatively narrow width sized to cover both the second opening 306 and the central opening 305*d*.

The top end of the first shutter plate 312 is pressurized and supported by means of a shutter pressure plate 310, thereby preventing the first shutter plate from being removed from the surface of the housing 303.

The second shutter plate 313 has the form of a rectangle having a comparatively greater width than the first shutter plate 312 and is sized to cover the first opening 316. The width dimension of the second shutter plate 313, measured in the lateral direction of the cartridge is greater than the width dimension of the first shutter plate 312 measured in the lateral direction of the cartridge. This suppresses a degree of torsion of the shutter member 311 itself, which will twist about the axial line defined in the longitudinal direction of the cartridge.

FIGS. 4 and 5 illustrate that a synthetic-resin shutter slider 315 is provided for guiding the shutter member 311 in the lateral direction of the cartridge. The shutter slider 315 includes a base 315*a* mounted at the inside of the connection portion 314 which extends in the lateral direction of the cartridge. The shutter slider 315 further includes a guide portion 315*b* formed integrally with the base 315*a* which projects toward the other side wall 308 of the housing 303 in the lateral direction of the cartridge. The shutter slider is provided between the upper and lower halves 304 and 305 in such a manner as to be slidable in the lateral direction of the cartridge.

The thickness of the guide portion 315*b* is of a size substantially equal to the thickness of the thin-walled central portion of the housing 303.

The base 315*a* of the shutter slide 315 is integrally formed with a first sliding portion 317 projecting inwardly from the front portion 309 of the housing 303 at a location adjacent to the one side wall 307 of the housing 303 and a second sliding portion 318 arranged at the side of the first sliding portion 317 and projecting inwardly from the front portion 309 of the housing 303 in the same manner as the first sliding portion. The sliding portions 317 and 318 provided at the base 315*a*, are formed with respective engaging grooves 317*a* and 318*a* both of which engage respectively the lower-second guide 305*i* and the upper-second guide 304*i*.

In the base 315*a*, a space 315$a_1$ and a spring hanger 315*c* facing the space 315$a_1$ are defined by forming a cut-out at a portion of the second sliding portion 318 adjacent to the connection portion of the shutter member. In addition, the guide portion 315*b* of the slider 315 is integrally formed with a connection portion 319 projecting inwardly from the front portion 309 of the housing 303 at a location adjacent to the side wall 308 of the housing 303. The top end of the connection portion 319 includes an engaging portion 320 which projects toward the side wall 308 of the housing 303 and engages both the upper-first guide 304*h* of the upper half 304 and the lower-first guide 305*h* of the lower half 305.

Moreover, the guide portion 315*b* includes an upper projection 322*a* and a lower projection 322*b* projecting in the vertical direction of the slider and arranged at the opposing end of the slider to the connection portion 318 so that the projections oppose the front portion 309 of the housing 303. The guide portion 315*b* is also formed with a pressure receiving portion 322 used for opening the shutter member and having a connection portion 322*c* interconnecting the projections 322*a* and 322*b*.

A pin guide surface 322*d* (see FIG. 6) is formed at the outside corner of the pressure receiving portion 322, which corner faces the other side wall 308 of the housing 303. This pin guide surface 322*d* is formed by chamfering by a dimensional value of a chamfer expressed by approximately C1, so that the pin guide surface is gradually spaced apart from both the pin guide surfaces 304$m_1$ and 305$_1$ of the upright portions 304*m* and 305*l* in accordance with the distance from the disk cartridge insertion side.

The pin guide surface 322*d* is constructed to be cooperative with both the pin guide surfaces 304$m_1$ and 305$l_1$, for guiding a shutter opening pin toward the shutter opening member engaging portion 324 when inserting the disk cartridge 301 into the cartridge holder to be described in more detail below.

Figure 7:
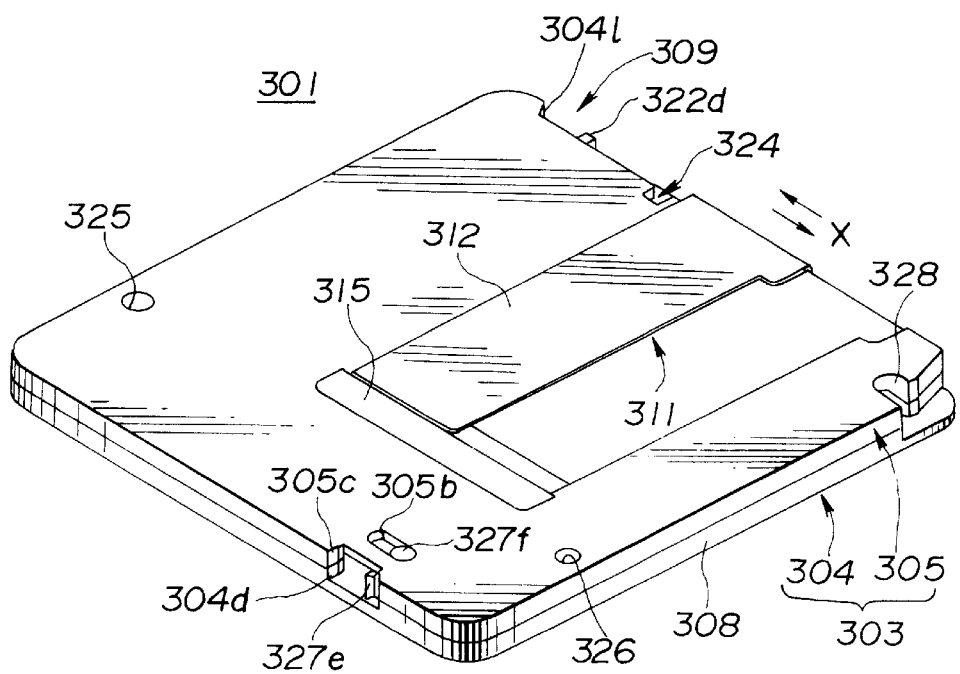
FIG. 7 is a bottom perspective view illustrating the disk cartridge of the present invention in its shutter closed state.
Figure 8:
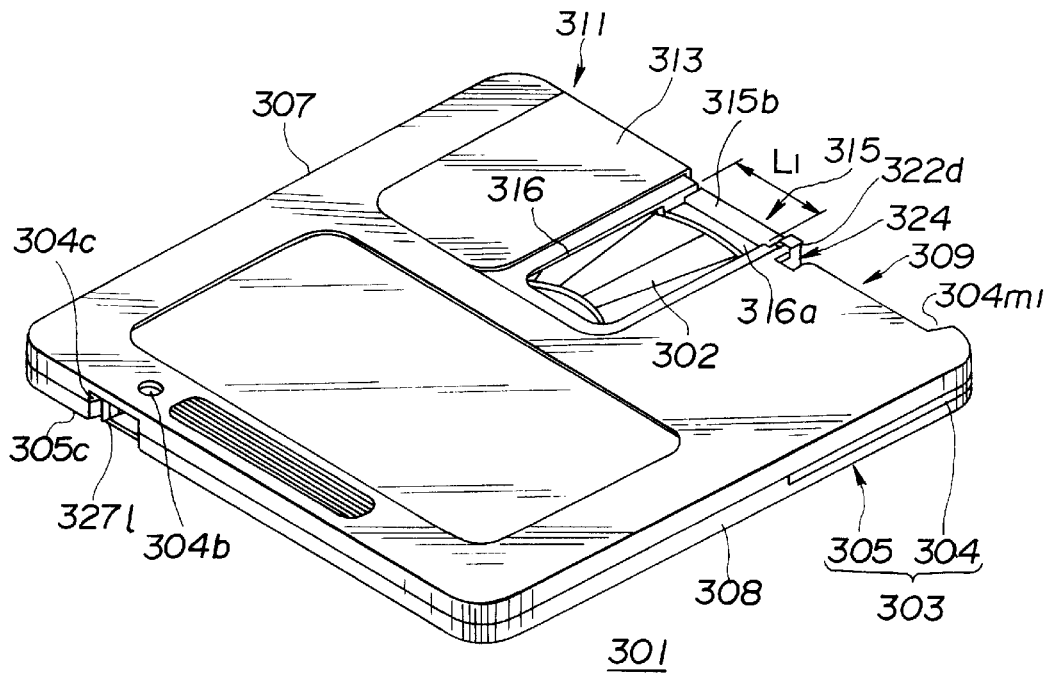
FIG. 8 is a top perspective view illustrating the disk cartridge of the present invention in its shutter open state.
Figure 9:
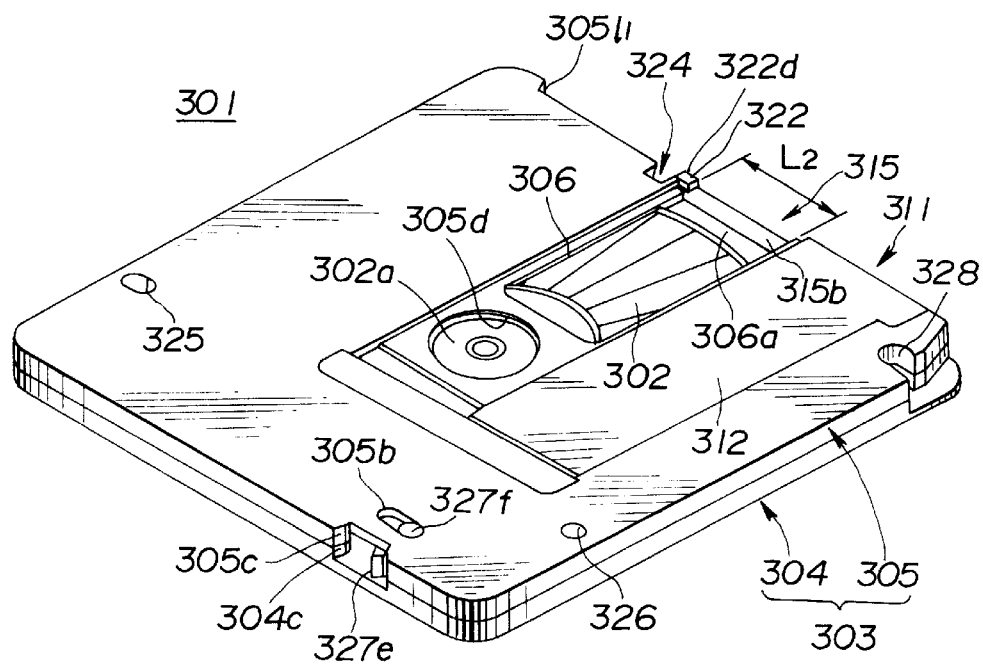
FIG. 9 is a bottom perspective view illustrating the disk cartridge of the present invention in its shutter open state.

FIG. 4 illustrates a coiled torsion spring 321 accommodated in the housing 303 which serves as a return spring for the shutter member. Respective ends of the spring are engaged by the spring hanger 305j of the lower half 305 and the spring hanger 315c of the slider 315. The coiled torsion spring 321 acts to constantly bias the shutter member 311 in a direction wherein the first opening 316 and the second opening 306 are closed. In FIG. 7 of the drawings, the arrow X indicates opposing directions, one being a direction wherein the shutter member 311 shuts both the openings 306 and 316, and the other being a direction wherein the shutter member opens both the openings 306 and 316.

With the above-noted arrangement of the disk cartridge, the thickness of the base $316a_1$ of the bridge portion 316a interconnecting, at the insertion end of the cartridge, both side edges of the first opening 316 of the upper half 304, is greater than the thickness of the base $306a_1$ of the bridge portion 306a interconnecting, at the insertion end of the cartridge, both side edges of the first opening 306 of the lower half 305.

Therefore, in the shown embodiment, when the upper and lower halves 304 and 305 are assembled to each other, the rigidity of the bridge portion 306a having a smaller half thickness is dependent upon the rigidity of the bridge portion 316a having a greater half thickness, and thus the rigidity of the housing 303 at the section of the bridges 306a and 316a is enhanced.

In the preferred embodiment, since the thickness of the base $316a_1$ of the bridge portion 316a is greater than the thickness of the base $306a_1$ of the bridge portion 306a, synthetic resin will smoothly flow in a mold during molding of the upper half, when that upper half 304 is made of synthetic resin. As a result of the smooth flow of synthetic resin, the flatness of the base $316a_1$ of the bridge portion 316a of the upper half is enhanced.

Figure 10:
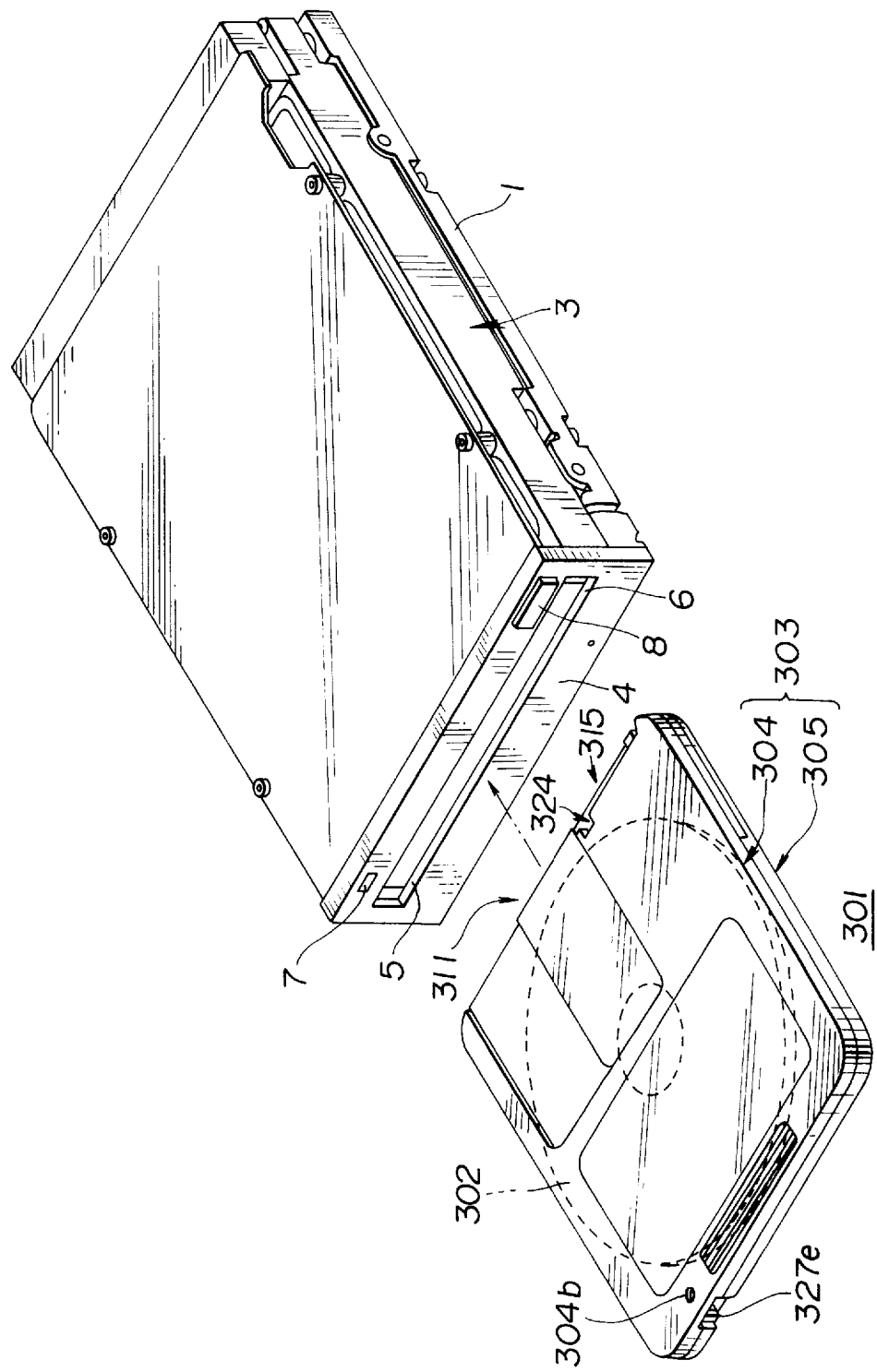
FIG. 10 is a top perspective view of the disk cartridge of FIGS. 3–9 being inserted into a preferred embodiment of a magneto-optic disk unit in accordance with the teachings of the present invention.
Figure 11:
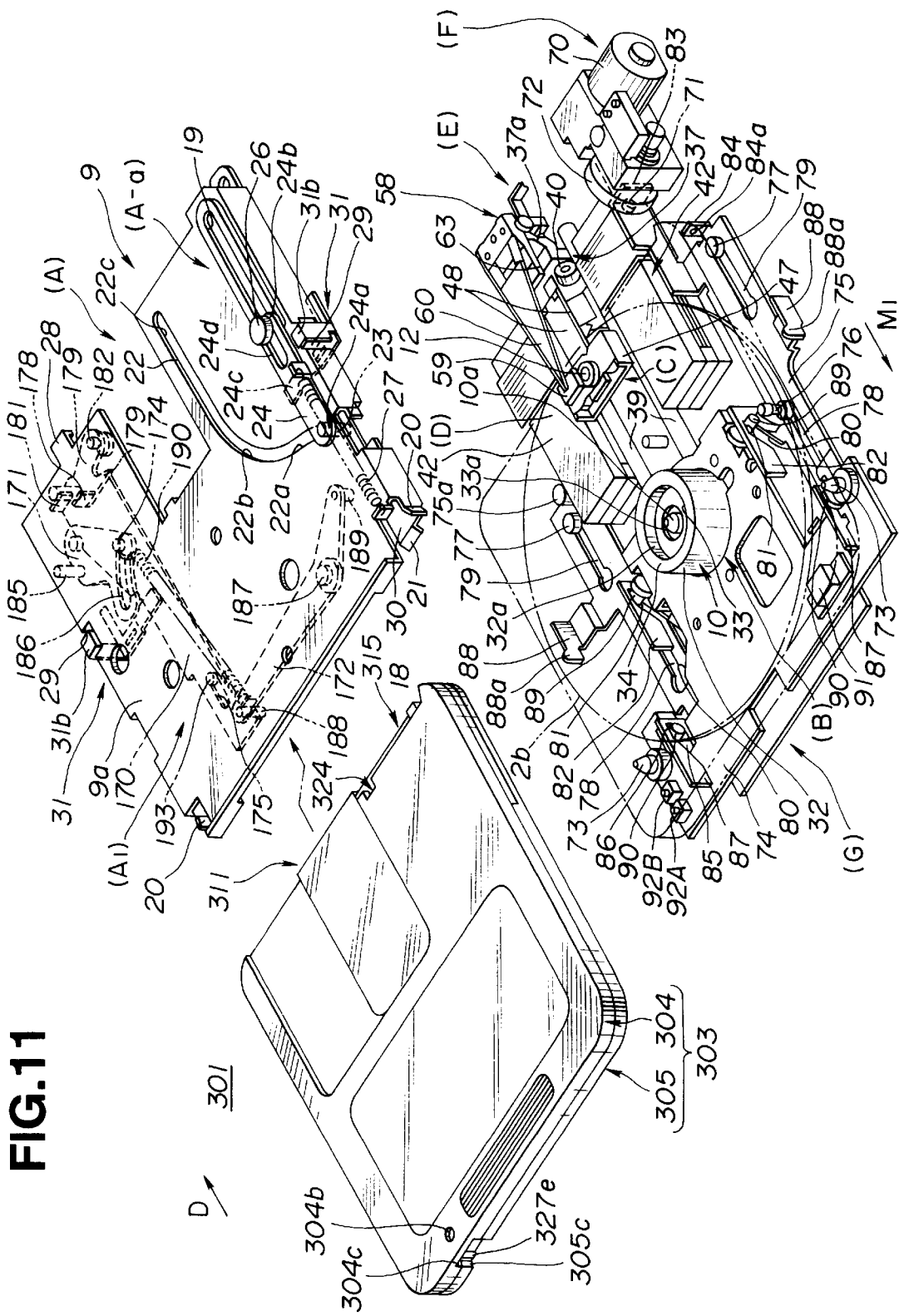
FIG. 11 is an exploded perspective view of the magneto-optic disk unit of FIG. 10.
Figure 12:
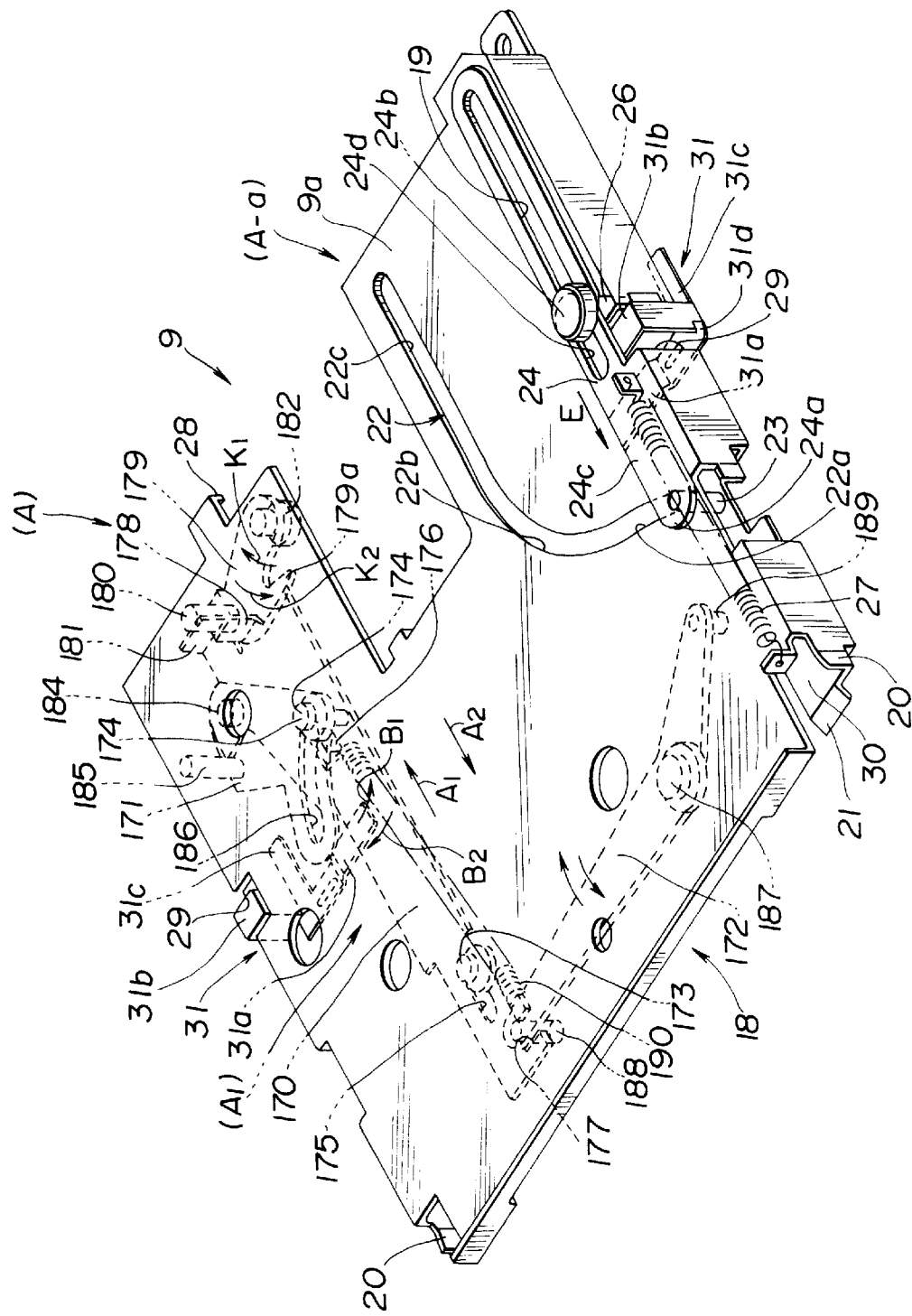
FIG. 12 is a perspective view illustrating a cartridge holder of the magneto-optic disk unit of FIG. 10.

Hereinafter explained in detail in accordance with FIGS. 10 through 12 is a magneto-optic disk unit which performs recording and/or reproducing functions for a magneto-optical disk accommodated in a disk cartridge in accordance with the teachings of the present invention as described above. The magneto-optic disk unit, as shown in FIG. 10, includes a casing (a main body of the disk unit) 3 which is mounted on a substantially C-shaped chassis 1 and accommodate therein various mechanisms provided for recording to and/or reproducing from the magneto-optic disk 302 of the disk cartridge 301. The disk unit also includes a front panel 4 arranged at the front portion of the casing 3. When assembled into a computer, a subsystem or the like, the front panel is mounted thereon in a manner so as to be exposed.

As is shown in FIG. 10, the front panel 4 is formed with a cartridge insert/eject opening 5 through which the disk cartridge 301 is inserted into or ejected from the inside of the casing 3. A dust lid 6 is rotatably provided along the front panel to open and close the cartridge insert/eject opening 5 and consequently to prevent entry of dust into the inside of the disk unit.

The front panel 4 is also formed with a light-emitting element 7 indicating the operative state of recording work or reproducing work for the magneto-optic disk 302 and an eject button 8 used to eject the disk cartridge 301.

As shown in FIG. 11, the casing 3 accommodates therein a cartridge loading/unloading mechanism (A) having a cartridge holder 9 which holds the disk cartridge 301 so that the disk cartridge can be inserted thereinto or ejected therefrom. The casing further includes a disk rotating mechanism (B) having a disk table provided below the cartridge loading/unloading mechanism to hold the magneto-optic disk 302 and a spindle motor 10 rotatably driving the disk table. An optical pick-up device (C) is also provided rearwardly of the disk rotating mechanism (B) which has an objective lens 12. Above the optical pick-up device (C), an external magnetic-field generator (D) is provided which has a magnetic-field application head. The casing 3 further includes a hold mechanism (E) located in the vicinity of the external magnetic-field generator (D) to hold the magnetic field application head at a loading position or at an unloading position. A drive mechanism (F) is provided at one side end of the hold mechanism (E) to apply a driving force to the magneto-field application head for the purpose of loading or unloading of the head and to apply a driving force to the disk cartridge 301 for the purpose of unloading the disk cartridge. In front of the drive mechanism (F), a lifter mechanism (G) is arranged to move upwardly and downwardly the disk rotating mechanism (B). A transmission mechanism (not shown) is provided in the rear of the lifter mechanism (G) to apply a driving force to the hold mechanism (E) for the purpose of loading or unloading of the head. Each of these components of the casing 3 will be described in further detail below.

(A) Cartridge loading/unloading mechanism

The cartridge loading/unloading mechanism (A) is equipped with the cartridge holder 9 having an auto-insert mechanism ($A_1$) which automatically inserts the disk cartridge 301 in the direction of insertion of the cartridge and ejects the disk cartridge in the direction of eject of the cartridge.

The cartridge holder 9 is comprised of a flat box-like body which has a longitudinally extending cartridge insert/eject opening 18 which is generally in the form of a rectangle and a guide groove 19 comprising an elongated hole extending in the longitudinal direction. A plurality of insertion guide members 20 and 21 are provided in the vicinity of corners of the cartridge insertion opening 18 of the cartridge holder 9, for guiding the disk cartridge 301 when inserting/ejecting the cartridge.

The cartridge holder 9 is formed with a shutter opening device (A-a), to automatically open the shutter member 311 of the disk cartridge 301. The shutter opening device (A-a) is formed by a cam groove 22 having such a locus as the shutter member 311 is opened in accordance with the inserting motion of the disk cartridge 301, and a shutter opening pin support member 24 having a shutter opening pin 23 which is moveable in the cam groove 22.

The cam groove 22 includes an inclined portion 22a obliquely inclined with respect to the direction of insertion of the disk cartridge 301, an arced portion 22b continuous with the inclined portion 22a, and a straight portion 22c continuous with the arced portion 22b and parallel to the direction of insertion of the disk cartridge 301.

The shutter opening pin support member 24 is formed of a plate-like member which has a front end portion 24a and a rear end portion 24b of a substantially semi-circular shape and a central portion 24c which is substantially rectangular in shape.

The shutter opening pin support member 24 is formed with a guide groove 24d which includes an elongated hole longitudinally extending from the rear end portion 24b toward the central portion and engages a flanged moveable guide pin 26 which pin is moveable along the direction of extension of the guide groove 19.

By means of a coiled tension spring 27, the shutter opening pin support member 24 is constantly urged in a direction in which the shutter opening pin 23 is positioned at the starting end of the cam groove 22.

As best shown in FIG. 12, a cartridge insertion position restricting piece 28 is bent downwardly at the left rear edge portion of a ceiling plate 9a of the cartridge holder 9 in such a manner as to project rearwardly of the cartridge holder, for restricting the movement of the disk cartridge 301 in the insertion direction thereof.

Furthermore, the cartridge holder 9 is formed with a pair of notches 29 at substantially the center of each side edge of the cartridge holder. A pair of cartridge pushing tabs 31 are attached to the holder in such a manner as to expose the respective notches 29, for forcing the disk cartridge 301 to a height-direction cartridge positioning portion 30.

The cartridge pushing tabs 31 include a support portion 31a fixedly connected to the bottom plate portion of the cartridge holder 9, a cartridge pushing portion 31b which is brought into contact with the upper surface of the disk cartridge 301 only during loading, a cartridge returning portion 31c which returns, during unloading, the cartridge pushing portion 31b to a non-contact position in which the cartridge pushing portion is disengaged from the upper surface of the disk cartridge, and a bent portion 31d provided at the connection portion interconnecting the support portion 31a and the cartridge pushing portion 31b, for preventing the cartridge pushing tabs from being caught on cartridge push-operation pieces (described below), when shifting from the loading condition to the unloading condition.

The auto-insert mechanism ($A_1$) for the cartridge holder 9 is described below. This auto-insert mechanism ($A_1$) includes a first insert plate 170 moveable in the insert/eject direction of the disk cartridge 301, a second insert plate 171 for inserting the disk cartridge 301 into the disk unit in accordance with the movement of the first insert plate 170, and a third insert plate 172 for forcibly applying a force to the first insert plate 170 for the purpose of movement of the first insert plate toward the inside of the cartridge holder 9.

As shown in FIGS. 11 and 12, the first insert plate 170 is provided at one side edge of the bottom plate portion of the cartridge holder 9. The first insert plate 170 is formed at both ends thereof with guide grooves 175 and 176 comprising respective elongated holes extending in the insert/eject direction of the disk cartridge 301 and engaging a pair of guide shafts 173 and 174 fitted on the bottom plate portion (not shown) of the cartridge holder 9. The guide shafts 173 and 174 are fitted into and engaged with the respective guide grooves 175 and 176 so that the first insert plate is moveable in the direction indicated by the arrows $A_1$ and $A_2$ of FIG. 12.

The first insert plate 170 is formed with a notch 177 which opens in a direction perpendicular to the insert/eject direction of the disk cartridge 301. In addition, the first insert plate 170 is formed at its rear end portion with a cartridge contacting portion 178 to which the shutter member 311 of the disk cartridge 301 abuts.

Also, the first insert plate 170 is formed at its rear inner end with a trigger arm rotation-operation tab 181 which is contact with a trigger arm pin 180 fitted on a trigger arm 179 attached onto the chassis 1. The trigger arm 179, which is contact with the trigger arm rotation-operation tab 181, holds the slide plate in its unloaded state to be described later. The trigger arm is rotatable about a support shaft 182 attached onto the bottom plate portion (not shown) of the cartridge holder 9. The trigger arm 179 is formed with an engaging nail 179a which engages a slide plate stopper pin. By means of a coiled torsion spring (not shown), the trigger arm 179 is rotatably biased constantly in a direction in which the engaging nail 179a is brought into engagement with the slide plate stopper pin.

The second insert plate 171 of the auto-insert mechanism $A_1$ is mounted in such a manner as to be rotatable about a support shaft 184 fitted on the rear end of the first insert plate 170, in the direction indicated by the arrow $B_1$ and arrow $B_2$ of FIG. 12. The second insert plate 171 is formed with the cartridge hold pin 185 which is insertedly engaged with the cartridge insert pin hole 328 of the disk cartridge 301 when the disk cartridge is inserted through the cartridge insert/eject opening 18 into the cartridge holder 9. The second insert plate 171 is also formed with a cam groove 186 through which the guide shaft 174 is insertedly engaged with the guide groove 176.

The cartridge hold pin 185 is positioned at the outside of the cartridge holder such that when the disk cartridge 301 is inserted into the cartridge 9, the cartridge insert pin hole 328 is opposed thereto. The cartridge hold pin is designed so that the pin 185 can be inserted into the cartridge insert pin hole 328 by way of rotation of the second insert plate 171.

The third insert plate 172 of the auto-insert mechanism $A_1$ is designed in such a manner so as to be rotatable about a support shaft 187 fitted on the bottom plate portion of the cartridge holder 9.

The third insert plate 172 is formed at one end with an insert plate operating pin 188 which engages the notch 177, and at the other end with a downwardly projecting insert plate hold pin 189 which is engageable with an insert plate hold piece (not shown) of the slide plate.

Additionally, the third insert plate 172 is constantly biased in a direction indicated by the arrow $C_1$ of the arrows $C_1$ and $C_2$ of FIG. 12, by way of the insert plate operating pin 188 and the coiled tension spring 190 engaged on the guide shaft 174.

(B) Disk rotation mechanism

The disk rotating mechanism (B) is equipped with the aforementioned spindle motor 10 which moves toward and away from the disk cartridge 301 by means of the lifter mechanism (G). The spindle motor 10 is provided in a cylindrical spindle support (disk table) 32 having a concavity 32a which opens upwardly (disk mount side).

A magnet 33 is accommodated within the concavity 32a of the support 32 for attracting the chucking hub 302a of the magneto-optic disk 302. An insertion hole 33a is provided in the center of the magnet 33 into which the spindle shaft 10a of the spindle motor 10 is inserted.

A flat disk mount surface (disk table surface) 34 is formed at the inner peripheral edge of the concavity 32a, for the purpose of mounting the magneto-optic disk 302. The level of the disk mount surface 34 is set at a slightly lower level than the top of the spindle shaft 10a.

(C) Optical pick-up device

The optical pick-up device (C) is designed so as to be able to emit a laser beam onto the main recording surface of the magneto-optic disk 302 at the disk mount portion formed in the inside of the casing 3. The optical pick-up device (C) is in the form of a separated optical system different from a conventional integrated optical system. The separated optical system of the optical pick-up device (C) has a light movable portion for the purpose of high-speed access.

More specifically, the optical pick-up device includes a fixed optical system (not shown) with a laser diode serving as a light source used for recording and reproduction, a signal detector used for focus control and tracking control, a signal detector used for detecting recorded signals, a carriage having an objective lens 12 provided therein for converging the laser beam emitted from the fixed optical system on the signal recording surface of the magneto-optic disk 302, and a galvanometer provided rearwardly of the carriage 37 for the tracking control. Respective elements forming the optical pickup device are separately located on the chassis 1.

The carriage 37 of the optical pick-up device is slidably supported by means of a pair of guide shafts 39 which are located above the chassis 1 and laterally spaced by a predetermined span to be parallel to each other. Two pairs of bearings 40 are located at the one side wall of the carriage 37 such that the angle between rotational axes of bearings of each bearing pair are approximately 90°. Likewise, a pair of bearings 40 are located at another side wall of the carriage 37 such that the angle between rotational axes of bearings of that bearing pair are approximately 90°.

An elastic member (not shown) is attached to one bearing of each bearing pair 40 so as to apply a resilient force to the bearing, such that the angle between the rotational axes of both bearings of each bearing pair is to be narrower than 90°. A linear motor 42 is provided at both sides of the carriage 37 to drive the carriage. Furthermore, in order to support the objective lens 12, a lens holder 47 is provided on the carriage 37 by means of two elastomeric bodies 48 placed side by side in their vertical direction.

(D) External magnetic-field generator

The external magnetic-field generator (D) has a slider (which will be hereinafter referred to as a "magnetic-field application head") 59 which incorporates a magnetic-field application head used to apply an external magnetic-field to the signal recording surface of the magneto-optic disk 302. The slider 59 of the external magnetic-field generator (D) will hereinafter referred to as a "magnetic-field application head." The external magnetic-field generator is provided rearwardly of the carriage 37 through the hold mechanism (E). The magnetic-field application head 59 of the external magnetic-field generator (D) comprises a floating magnetic head for the purpose of magnetic-field modulation overwrite.

(E) Hold mechanism

The hold mechanism (E) includes a lifter 58 which is supported by a raised portion 37a formed at the rear end of the carriage 37 and is rotated by a driving force created by a drive mechanism (F). The hold mechanism (E) further includes a head arm 60 which is provided above the lifter 58 and is rotatably supported by the raised portion 37a of the carriage 37 in such a manner so as to support the magnetic-field application head 59. The hold mechanism is designed to hold the head arm 60 and the lifter 58 between a loading position, wherein a magnetic field can be applied from the magnetic-field application head 59 to the magneto-optic disk 302, and an unloading position, wherein the magnetic-field application head 59 is spaced apart from the disk mount surface 34.

In order to ensure stability of the head during "floating" thereof, the head arm 60 of the hold mechanism (E) is designed to operate between a first position, wherein the magnetic-field application head 59 is spaced apart from the signal recording surface of the magneto-optic disk 302 in its unloading state, and a second position, wherein the magnetic-field application head 59 is in contact with the signal recording surface of the magneto-optic disk 302 with a pushing force of a few grams to 10 grams in its loading state.

(F) Drive mechanism

The drive mechanism (F) includes a drive motor 70 serving as a drive source which ejects the disk cartridge 301 and provides a drive source to hold or release the locked state of the lifter 58 by virtue of a transmission mechanism (not shown). The drive mechanism (F) further includes a transmission gear 72 which has a driven connection with the drive motor 70. In addition, a cylindrical pin 71 projects from the perimeter of one side wall of the transmission gear 72 in a direction perpendicular to the advancing/retracting direction of the carriage 37. Positive rotation of the transmission gear 72 causes a rotational motion of the pin 71, thereby returning the slide plate from its loading position to its unloading position. In contrast, the rotational motion of the pin 71, resulting from negative rotation of the transmission gear 72, permits a rotational force to be applied to the lifter 58 through the transmission mechanism (not shown). The displacement of the pin 71, resulting from the positive rotation of the transmission gear 72, causes ejection of the disk cartridge 301.

By way of the displacement of the pin 71, resulting from the negative rotation of the transmission gear 72, the locked state of the lifter 58 is released by virtue of the transmission mechanism, and thus the loading action of the magnetic-field application head 59 onto the magneto-optic disk 302 can be achieved when the carriage 37 is positioned at the outermost position of the disk.

(G) Lifter mechanism

The lifter mechanism (G) includes a substantially T-shaped lifter plate 74 which is provided on the chassis 1 so as to be moveable upwardly and downwardly. This lifter plate 74 supports the cartridge positioning pins 73 used for the positioning of the disk cartridge 301 and the disk rotating mechanism (B) used to rotatably drive the magneto-optic disk 302. The lifter mechanism (G) further includes a substantially C-shaped slide plate 75 which is provided below the lifter plate 74 and advances or retracts in the longitudinal direction in accordance with the loading/unloading motion of the disk cartridge 301.

As is shown in FIG. 11, elongated holes 78 and 79 are provided at both sides of the slide plate 75 of the lifter mechanism (G) close to the rear end and to the substantially center portion of the slide plate. A spring hanger shaft (also serving as the guide shaft) 76 and a guide shaft 77, both shafts projecting from the chassis 1, are inserted through the elongated holes 78 and 79, respectively, and are thus exposed.

First cam pieces 82 are provided in the vicinity of the respective elongated holes 78 located at the substantially center portion of the slide plate 75. Each first cam piece 82 has an obliquely and forwardly extending down-sloped groove 80 and a horizontally extending parallel groove 81 continuous with the sloped groove 80. Formed integrally with the slide plate in the vicinity of the elongated hole 79 located at the rear end of the slide plate and facing the drive motor are a rearwardly extending slide plate return piece 83 engageable with the pin 71 and an upwardly bent spring hanger 84 with a through opening 84a which opens in the longitudinal direction.

Second cam pieces 87 are provided at the front end of the slide plate 75 and at both sides thereof. Each second cam piece 87 has an obliquely and frontwardly extending down-sloped groove 85 and a horizontally extending parallel groove 86 continuous with the sloped groove 85. The inclination angle of the sloped groove 85 of the second cam piece 87 is set at a angle greater than the inclination angle of the sloped groove 80 of the first cam piece 82. The slide plate is integrally formed with cartridge push-operation pieces 88 at its substantially center outermost sides, by way of bending. Each cartridge push-operation piece has a projected portion 88a for pushing the cartridge pushing, tab 31.

The slide plate 75 is formed at its rear end adjacent to one side with a slide plate engaging pin 75a which is engageable with the engaging nail 179a of the trigger arm 179. The slide plate is formed at its front end adjacent to the other side with an insert plate hold piece which is engageable with the insert plate hold pin 189.

A spring bias is constantly applied to the slide plate 75 by means of the coiled tension spring biased between the spring hanger shaft 76 and the spring hanger 84 such that the slide plate is returned from the rear (unloading position) of the chassis to the front (loading position) of the chassis, as indicated by the arrow $M_1$ of FIG. 11.

As shown in FIG. 11, first pins 89 are rotatably provided at the rear end of the lifter plate 74 and at both sides thereof. Each first pin 89 exposes the sloped groove 80 and the parallel groove 81. Second pins 90 are rotatably provided at the front end of the lifter plate 74 and at both sides thereof. Each second pin 90 exposes the sloped groove 85 and the parallel groove 86.

Moreover, a temperature sensor 91, a write protect switch 92A and disk type detection switch 92B are mounted on the front end of the lifter plate 74.

With this arrangement, the loading operation of the disk cartridge into the magneto-optic disk unit is performed as follows.

In the loading operation of the disk cartridge, the disk cartridge 301 is initially inserted through the cartridge insert/eject opening 18 into the cartridge holder 9 in the direction indicated by the arrow D of FIG. 11. At this time, the shutter opening pin 23 abuts the front portion 309 of the disk cartridge 301.

Subsequently, when the disk cartridge 301 is further inserted into the cartridge holder 9, the shutter opening pin 23 moves along the inclined portion 22a of the cam groove 22 by virtue of pressure of the disk cartridge 301. Then, the shutter opening pin support member 24 moves along the inclined groove 22a of the cam groove 22 against the spring bias of the coiled tension spring 27, while rotating about the moveable guide pin 26 which is positioned in its initial position within the guide groove 19. As a result, the shutter member 311 moves against the bias of the coiled torsion spring 321 of the cartridge 303 in the direction in which the openings 306 and 316 of the upper and lower halves 304 and 305 can be opened.

When the disk cartridge 301 is further inserted into the cartridge holder 9, the shutter opening pin 23 moves along the arced portion 22b of the cam groove 22 toward the straight portion 22c, and thus the shutter member 311 further moves in the opening direction of the openings 306 and 316 of the disk cartridge 301. At this time, the shutter opening pin 24 rotates about the moveable guide pin 26 located in the initial position in the same manner that the shutter opening pin 23 has moved along the inclined portion 22a. Subsequent thereto, when the shutter opening pin 23 reaches the rear end portion of the arced portion 22b, the pin enters the shutter opening member engaging portion 324. As a consequence, the openings 306 and 316 of the disk cartridge 301 are fully opened, and thus a portion of the magnet-optic disk 302 is exposed.

When the disk cartridge 301 is further inserted into the cartridge holder 9, the moveable guide pin 26 abuts the front portion 309 of the disk cartridge 301. With further insertion, the shutter opening pin 23 moves along the straight portion 22c of the cam groove 22 in the direction of the insertion of the cartridge and additionally the shutter opening pin support member 24 moves along the guide groove 19. In the middle of the above-noted motion, the disk cartridge 301 abuts the cartridge contacting portion 178 of the first insert plate 170. Subsequently, when the disk cartridge 301 is inserted into the cartridge holder 9, the first insert plate 170 moves in the direction indicated by the arrow $A_1$ of FIG. 12.

In accordance with the movement of the first insert plate 170, the second insert plate 171 moves in the direction of insertion of the cartridge (the direction indicated by the arrow $A_1$), and also rotates in the direction indicated by the arrow B1 of FIG. 12 in such a manner as to move along the cam groove 186. As a result, the cartridge hold pin 185 gradually enters the cartridge insert pin hole 328. As the disk cartridge 301 is further inserted into the cartridge holder 9, the trigger arm rotation-operation tab 181 is brought into contact with the trigger arm pin 180. When the first insert plate 170 further moves in the direction of insertion of the cartridge, the trigger arm 179 rotates about the support shaft 182 in the direction indicated by the arrow $K_1$ of FIG. 12, with the result that the engaging nail 179a is disengaged from the slide plate engaging pin 75a. As a result, the slide plate 75 which is guided by the guide shafts 76 and 77, begins to move on the chassis 1 in the direction indicated by the arrow $M_1$ of FIG. 11, by way of the coiled tension spring (not shown).

At this time, an insert plate support plate (not shown) of the slide plate 75 is disengaged from the insert plate support pin 189 of the third insert plate 172, and then the third insert plate 172 is forcibly rotated about the support shaft 187 in the direction indicated by the arrow $C_1$ of FIG. 12 by way of the bias of the coiled tension spring 190. When the third insert plate 172 rotates in the direction indicated by the arrow $C_1$, the first insert plate 170 moves in the direction indicated by the arrow $A_1$ of FIG. 12 due to pressure which will be applied through the insert plate operating pin 188. At this time, the cartridge holder pin 185 has already entered the cartridge insert pin hole 328 of the disk cartridge 301, and thus the disk cartridge 301 is automatically inserted deeply into the cartridge holder 9.

In this manner, the shutter member 311 firmly abuts the cartridge insertion position restricting piece 28, and as a result, the mount position of the disk cartridge 301 is determined.

The movement of the slide plate 75 toward the cartridge insert/eject opening 18 prevents the projected portion 88a of the cartridge push-operation piece 88 from being disengaged from the cartridge returning portion 31c of the cartridge pushing tab 31 and ensures the insertion of the disk cartridge 301 into the cartridge holder 9. Thereafter, the cartridge pushing portion 31b of the cartridge pushing tab 31 enters the cartridge holder 9, with the result that the upper surface 301a of the disk cartridge 301 is pushed downwardly. As a result, the disk cartridge 301 is pushed to the height-direction cartridge positioning portion 30 of the cartridge holder 9 by way of the pressure of the disk cartridge pushing tab 31, and whereby the disk cartridge is held at the predetermined height level.

Owing to a further movement of the slide plate 75 toward the cartridge insert/eject opening 18, the first cam piece 82 and the second cam piece 87 are bought into engagement with the first pin 89 and the second cam piece 87, respectively. Subsequently, when the slide plate 75 further moves toward the insert/eject opening 18, the first pin 89 rolls upward along the sloped groove 80 of the first cam piece 82, whereas the second pin 90 rolls upward along the sloped groove 85 of the second cam piece 87. In this case, since the inclination angle of the sloped groove 85 of the second cam piece 87 is greater than that of the sloped groove 80 of the first cam piece 82, the second pin 90 reaches the parallel groove 86 of the second cam piece 87 before the first cam pin 89 reaches the parallel groove 81 of the first cam piece 82. As a result, a front end portion of both end portions of the lifter plate 74 is lifted up first, and thus the cartridge positioning pin 73 lifts up earlier than the spindle motor 10.

Accordingly, the cartridge positioning pins 73 are respectively inserted into the cartridge positioning-pin engagement holes 325 and 326, and as a result, the disk cartridge 301 is firmly positioned in the cartridge holder 9. Thereafter, when the first pin 89 reaches the parallel groove 81 of the first cam piece 82, the spindle motor 10 lifts up such that the lifter plate 74 is brought into contact with the spindle height positioning member (not shown). As a consequence, the spindle shaft 10a of the spindle motor 10 is inserted into the chucking hub 302a of the magneto-optic disk 302. Then, the chucking action for the magneto-optic disk 302 is completed. In this manner, the installation of the magneto-optic disk 302 into the magneto-optic disk unit is achieved.

Unloading motion of the disk cartridge 301 from the magneto-optic disk unit can be performed as follows.

As soon as the transmission gear 72 is initially rotated in its reverse direction by way of the drive motor 70, the pin 71 pushes the slide plate return piece 83 in the direction of insertion of the disk cartridge 301, with the result that the slide plate 75 is pulled and returned from the loading position to the unloading position. As a result, the second pin 90 rolls along the sloped portion 85 below the parallel groove 86 of the second cam groove 87, while the first pin 89 rolls along the sloped portion 80 below the parallel groove 81 of the first cam piece 82. The lifter plate 74 is thereby disengaged from the spindle height positioning member (not shown) and moves downwardly.

Then, the cartridge positioning pins 73 are disengaged from the cartridge positioning pins 325 and 326 of the cartridge 301. As a result, the positioning action of the cartridge positioning pins 73 to the cartridge 301 is released, and simultaneously the spindle shaft 10a of the spindle motor 10 is spaced apart from the chucking hub 302a. The magneto-optic disk 302 is thereby disengaged from the magnet 33 accommodated in the spindle support 32 in such a manner as to exit the chucking state of the magneto-optic disk 302.

Movement of the slide plate 75 in the direction of insertion of the disk cartridge 301 permits the projected portions 88a of the cartridge push-operation pieces 88 to engage with the cartridge returning portion 31c of the cartridge pushing tab 31. The cartridge pushing portion 31b is thus exposed to the exterior of the cartridge holder 9 to release the pressure applied onto the upper surface 301a of the disk cartridge 301.

The slide plate 75 further moves in the direction of the insertion of the cartridge, and thus the insert plate support (not shown) of the slide plate 75 is pushed to and is engaged with the insert plate support pin 189 of the third insert plate 172. As a result, the third insert plate 172 rotates about the support shaft 187 in the direction indicated by the arrow $C_2$ of FIG. 12, against the bias of the coiled tension spring 190.

In accordance with the rotation of the third insert plate 172, the first insert plate 170 moves in a direction indicated by the arrow A2 of FIG. 12 (the eject direction of the disk cartridge 301), by virtue of pushed engagement of the insert plate operating pin 188.

In accordance with the movement of the first insert plate 170, the second insert plate 171 rotates along the cam groove 186 in the direction indicated by the arrow $B_2$ of FIG. 12. As a result, the cartridge hold pin 185 moves toward the exterior of the cartridge insert pin hole 328. Under this condition, it is possible to eject the disk cartridge 301 from the cartridge holder 9.

In accordance with the movement of the first insert plate 170, the trigger arm 179 rotates in the direction indicated by the arrow K2 of FIG. 12 against the bias of the coiled torsion spring (not shown). As a result, the engaging nail 179a of the trigger arm 179 is brought into engagement with the slide plate engaging pin 75a. Thereafter, when the disk cartridge 301 moves in the direction of ejection of the cartridge by virtue of the bias of coiled tension spring 27, the shutter opening pin 23 moves along the straight portion 22c of the cam groove 22 toward the arced portion 22b. In addition, the shutter opening pin support member 24 moves along the guide groove 19 in the direction of ejection of the cartridge.

Owing to the movement of the disk cartridge 301 in the cartridge eject direction, when the shutter opening pin 23 reaches the rear end of the arced portion 22b and additionally the moveable guide pin 26 reaches the starting point (initial position) of the guide groove 19, the moveable guide pin 26 begins to move away from the front portion 309 of the disk cartridge 301. As a consequence, the shutter opening pin 23 moves along the arced portion 22b toward the sloped portion 22a.

When the shutter opening pin 23 moves along the arced portion 22b, the shutter opening pin support member 24 rotates about the moveable guide pin 26 located in the initial position of the guide groove 19. Subsequently, as the disk cartridge 301 further moves in the cartridge ejection direction, the shutter opening pin 23 passes through the starting point of the arced portion 22b and moves along the sloped portion 22a of the cam groove 22. At this time, by way of the bias of the coiled torsion spring 321, the shutter member 311 moves in such a direction that the openings 306 and 316 of the halves 304 and 305 are closed.

As the disk cartridge 301 further moves in the cartridge ejection direction, the shutter opening pin 23 is spaced apart from the front portion 309 of the housing 303 so that a part of the disk cartridge 301 is ejected from the cartridge holder 9. In this manner, the disk cartridge 301 is unloaded out of the magneto-optic disk unit.

Based upon the foregoing, a disk cartridge is provided in which a magneto-optic disk 302 is loaded into a housing 303. The housing of the disk cartridge of the present invention includes two openings; namely, an opening facing a magnetic field application head and an opening facing an objective lens assembly when the disk cartridge is inserted in the disk unit. Each of these openings is of a defined width wherein the defined width of one of the openings is smaller than the defined width of the other of the openings.

Moreover, in the disk cartridge of the present invention, two bridge portion are provided with each bridge portion interconnecting, at a cartridge insertion end thereof, side edges of an opening of each half of the cartridge. The thickness of a base of one of the bridge portions is larger than the thickness of the base of the other of the bridge portions.

Therefore, when the respective halves are assembled to each other, the rigidity of the bridge having the smaller half thickness is dependent upon the rigidity of the bridge having the greater half thickness, and consequently, the total rigidity of the cartridge with respect to both bridge portions is enhanced. This reduces chances of damage to the bridge portions as a result of shock forces generated by dropping of the cartridge.

It will be understood that the present invention is not limited to the particular embodiments shown and described herein, but that the present invention is applied to a disk cartridge in which a magnetic disk or an optical disk is loaded into a cartridge.

Although the invention has been particularly shown and described with reference to certain preferred embodiments, it will be readily appreciated by those of ordinary skill in the art that various changes and modifications may be made therein without departing from the spirit and scope of the invention. It is intended that the appended claims be interpreted as including the foregoing as well as various other such changes and modifications.

What is claimed is:

1. A disk cartridge for loading on a disk drive which records and/or reproduces an information signal on a disk or from a disk provided in the disk cartridge, comprising:

a cartridge housing being comprised of an upper half having a first opening and first bridge portion interconnecting both side edges of the first opening at a cartridge insertion end, and a lower half assembled with the upper half and having a second opening opposed to the first opening and a second bridge portion opposed to the first bridge portion and interconnecting both side edges of the second opening at the cartridge insertion end wherein said first and second bridge portions are formed of cut-out concavities only surrounding respectively said first and second openings;

a disk rotatably provided between the upper and lower halves and having a signal recording surface facing a plane defined by each of the openings, a shutter attached to the cartridge housing which is slidable so as to open and close both of the openings, wherein each of the first and second bridge portions include a thin-walled portion at the locations corresponding to the first opening and the second opening respectively so as to allow an easy approach of a head device installed in the disk drive to the signal recording surface of the disk, and wherein a first thickness dimension of the thin-walled portion of one of said first and second bridge portions, measured in a lateral direction of the cartridge housing, is greater than a first thickness dimension of the thin-walled portion of the other of said first and second bridge portions, measured in the lateral direction of the cartridge housing, and wherein a second thickness dimension of a first base member of one of said first and second bridge portions is greater than the second thickness dimension of a second base member of the other of said first and second bridge portions.

2. The disk cartridge according to claim 1, wherein both the openings of the upper and lower halves are of a defined width measured in the lateral direction of the cartridge housing and are formed of rectangular openings sized to expose a portion of the signal recording surface of the disk, and wherein the defined width dimension of the first opening is smaller than the defined width dimension of the second opening.

3. The disk cartridge according to claim 1, wherein both the openings of the upper and lower halves are of a defined width measured in the lateral direction of the cartridge housing and wherein when the disk cartridge is loaded in the disk drive, the first opening faces a magnetic-field application head provided in the disk drive, and the second opening faces an objective lens of an optical pick-up device provided opposite the magnetic-field application head in the disk drive, and wherein the defined width dimension of the first opening of the upper half is smaller than the defined width dimension of the second opening of the lower half.

4. The disk cartridge according to claim 1, wherein the shutter comprises a first shutter plate capable of shutting the first opening of the upper half, a second shutter plate which is arranged in parallel relationship with the first shutter plate to shut the second opening-of the lower half, a connection portion interconnecting bases of the first shutter plate and the second shutter plate, and wherein a shutter slider is provided among the upper and lower halves in such a manner as to be slidable in the lateral direction of the cartridge housing, and the shutter slider has a base mounted at the inside of the connection portion of the shutter, and a guide portion formed integrally with the base in which the thicknesses thereof is set at a size substantially equal to the thickness of the first and second thin-walled portions of the respective first and second bridge portions.

5. A disk cartridge for accommodating a disk having a main recording surface on one side thereof and a protective surface on an opposite side thereof with the disk cartridge being insertable at a cartridge insertion end thereof into a disk unit which writes information signals to and/or reads information signals from the main recording surface of the disk and includes an objective lens assembly for converging a laser beam on the main recording surface of the disk and a magnetic field application head for applying an external magnetic field to the disk, the disk cartridge comprising a housing including an upper half and a lower half in opposed relation with the disk being rotatably accommodated between said upper and lower halves, said upper half having a first opening for exposing the protective layer to the magnetic field application head and said lower half having a second opening for exposing the main recording surface to the objective lens assembly when the disk cartridge is inserted into the disk unit, said first and second openings being of a defined width measured in a lateral direction of the cartridge at the cartridge insertion end and respectively having first and second pairs of opposed side edges, said upper and lower halves further having respective first and second bridge portions at the cartridge insertion end which are formed of cut-out concavities only surrounding respectively said first and second openings and which interconnect respectively said first and second pair of opposed side edges and wherein the defined width of one of said first and second openings is smaller than the defined width of the other of said first and second openings, and a thickness of a first base member of one of said first and second bridge portions is greater than the thickness of a second base member of the other of said first and second bridge portions.

6. The disk cartridge as claimed in claim 5 wherein the defined width of said first opening of said upper half is smaller than the defined width of the second opening of the lower half.

7. The disk cartridge of claim 5 wherein said disk is a magneto-optic disk.

8. The disk cartridge of claim 5 wherein the thickness of one of said first and second bridge portions is greater than the thickness of the other of said first and second bridge portions.

9. The disk cartridge of claim 5 wherein the thickness of said first bridge portion is greater than the thickness of said second bridge portion.

10. A disk cartridge for accommodating a disk having a main recording surface on one side thereof and a protective surface on an opposite side thereof with the disk cartridge being insertable at a cartridge insertion end thereof into a disk unit which writes information signals to and/or reads information signals from the main recording surface of the disk, the disk cartridge comprising first and second openings provided on opposing halves of the cartridge at the cartridge insertion end thereof which are each of a defined width measured in the lateral direction of the cartridge and each has a respective first and second pair of side edges, said first and second openings respectively exposing said protective layer and said main recording surface when the cartridge is inserted into the disk unit and wherein the defined width of one of said first and second openings is smaller than the defined width of the other of said first and second openings, said opposing halves further having respective first and second bridge portions at the cartridge insertion end wherein said first and second bridge portions are formed of cut-out concavities only surrounding respectively said first and second openings and which interconnect respectively said first and second pair of opposed side edges and wherein a thickness of a first base member of one of said first and second bridge portions is greater than the thickness of a second base member of the other of said first and second bridge portions.

11. The disk cartridge as claimed in claim 10 wherein said first opening is capable of exposing said protective layer to a magnetic field application head of the disk unit for applying an external magnetic field to the disk when the cartridge is inserted into the disk unit.

12. The disk cartridge as claimed in claim 10 wherein said second opening is capable of exposing said main recording surface to an objective lens assembly of the disk unit for converging a laser beam on the main recording surface when the cartridge is inserted into the disk unit.

13. The disk cartridge as claimed in claim 10 wherein the defined width of said first opening is smaller than the defined width of said second opening.

14. The disk cartridge as claimed in claim 10 wherein the disk is a magneto-optic disk.

15. The disk cartridge as claimed in claim 10 wherein said first and second openings respectively have first and second pairs of opposed side edges with first and second bridge portions provided on opposing halves of the cartridge at the cartridge insertion end thereof interconnecting respectively said first and second pairs of opposed side edges.

16. The disk cartridge as claimed in claim 15 wherein the thickness of one of said first and second bridge portions is greater than the thickness of the other of said first and second bridge portions.

17. The disk cartridge as claimed in claim 16 wherein the thickness of said first bridge portion is greater than the thickness of said second bridge portion.

18. A disk cartridge for accommodating a disk having a main recording surface on one side thereof and a protective surface on an opposite side thereof with the disk cartridge being insertable at a cartridge insertion and thereof into a disk unit which writes information signals to and/or reads information signals from the main recording surface of the disk and includes an objective lens assembly for converging a laser beam on the main recording surface of the disk and a magnetic field application head for applying an external magnetic field to the disk, the disk cartridge comprising a housing including an upper half and a lower half in opposed relation with the disk being rotatably accommodated between said upper and lower halves, said upper half having a first opening for exposing the protective layer to the magnetic field application head and said lower half having a second opening for exposing the main recording surface to the objective lens assembly when the disk cartridge is inserted into the disk unit, said first and second openings further including respective first and second pairs of opposed side edges, said upper and lower halves further having respective first and second bridge portions at the cartridge insertion end which are formed of cut-out concavities only surrounding respectively said first and second openings and which interconnect respectively said first and second pairs of opposed side edges wherein a first thickness dimension of a thin-walled portion of one of said first and second bridge portions is greater than the first thickness dimension of a thin-walled portion of the other of said first and second bridge portions, measured in the lateral direction of the cartridge, and a second thickness dimension of a first base member of one of said first and second bridge portions is greater than the second thickness dimension of a second base member of said first and second bridge portions.

19. This disk cartridge as claimed in claim 18 wherein the thickness of the first bridge portion is greater than the thickness of the second bridge portion.

20. The disk cartridge as claimed in claim 18 wherein each of said first and second openings is of a defined width measured in a lateral direction of the cartridge at the cartridge insertion end wherein the defined width of one of said first and second openings is smaller than the defined width of the other of said first and second openings.

21. A disk cartridge for accommodating a disk having a main recording surface on one side thereof and a protective surface on an opposite side thereof with the disk cartridge being insertable at a cartridge insertion end thereof into a disk unit which writes information signals to and/or reads information signals from the main recording surface of the disk, the disk cartridge comprising:

first and second openings provided on opposing halves of the cartridge at the cartridge insertion end thereof, said first and second openings respectively exposing a protective layer and the main recording surface when the cartridge is inserted into the disk unit, said first and second openings further having first and second pairs of opposed side edges; and first and second bridge portions provided at the cartridge insertion end which are formed of cut-out concavities only surrounding respectively said first and second openings and which interconnect respectively said first and second pairs of opposed side edges wherein a thickness of a first base member of one of said first and second bridge portions is greater than the thickness of a second base member of the other of said first and second bridge portions.

22. The disk cartridge as claimed in claim 21 wherein the thickness of said first bridge portion is greater than the thickness of said second bridge portion.

23. The disk cartridge as claimed in claim 21 wherein each of said first and second openings is of a defined width measured in the lateral direction at the cartridge insertion end and wherein the defined width of one of said first and second openings is smaller than the defined width of the other of said first and second openings.

24. The disk cartridge as claimed in claim 23 wherein the defined width of said first opening is smaller than the defined width of said second opening.

25. The disk cartridge of claim 21 wherein said first opening is capable of exposing the protective layer to a magnetic field application head of the disk unit for applying an external magnetic field to the disk when the cartridge is inserted into the disk unit.

26. The disk cartridge as claimed in claim 21 wherein said second opening is capable of exposing the main recording surface to an objective lens assembly of the disk unit for converging a laser beam on the main recording surface when the cartridge is inserted into the disk unit.

27. The disk cartridge as claimed in claim 21 wherein the disk is a magneto-optic disk.

* * * * *